(12) United States Patent
Wiegand

(10) Patent No.: US 10,032,183 B2
(45) Date of Patent: Jul. 24, 2018

(54) INCREASE VALUE OF CONSUMER COUPONS

(71) Applicant: CAROLINA COUPON CLEARING, INC., Winston-Salem, NC (US)

(72) Inventor: Brian Thomas Wiegand, Waunakee, WI (US)

(73) Assignee: CAROLINA COUPON CLEARING, INC., Winston-Salem, NC (US)

( * ) Notice: Subject to any disclaimer, the term of this patent is extended or adjusted under 35 U.S.C. 154(b) by 368 days.

(21) Appl. No.: 13/828,478

(22) Filed: Mar. 14, 2013

(65) Prior Publication Data

US 2014/0278878 A1 Sep. 18, 2014

(51) Int. Cl.
*G06Q 30/02* (2012.01)

(52) U.S. Cl.
CPC ..... *G06Q 30/0224* (2013.01); *G06Q 30/0233* (2013.01)

(58) Field of Classification Search
CPC .................................. G06Q 30/0207–30/0277
See application file for complete search history.

(56) References Cited

U.S. PATENT DOCUMENTS

| | | | |
|---|---|---|---|
| 5,907,830 A | 5/1999 | Engel et al. | |
| 2003/0065805 A1* | 4/2003 | Barnes, Jr. ............. | G06Q 10/02 709/231 |
| 2004/0030598 A1* | 2/2004 | Boal ...................... | G06Q 30/02 705/14.25 |
| 2009/0076912 A1* | 3/2009 | Rajan et al. ..................... 705/14 | |
| 2011/0153403 A1* | 6/2011 | Postrel ................... | G06Q 30/02 705/14.29 |
| 2012/0041810 A1* | 2/2012 | Hofer ......................... 705/14.23 | |
| 2012/0053999 A1* | 3/2012 | Pan .............................. 705/14.1 | |
| 2012/0136699 A1 | 5/2012 | Martin et al. | |
| 2012/0215618 A1 | 8/2012 | Myman et al. | |
| 2012/0253901 A1* | 10/2012 | Montgomery et al. ...... 705/14.5 | |
| 2012/0330741 A1* | 12/2012 | Cruz .......................... 705/14.31 | |

(Continued)

OTHER PUBLICATIONS

"Everyone gets the best deal when they help Share It Up," © ShareitUp, accessed Jun. 14, 2013, 2 pages.

(Continued)

*Primary Examiner* — David J Stoltenberg
(74) *Attorney, Agent, or Firm* — Allen, Dyer, Doppelt + Gilchrist, P.A.

(57) ABSTRACT

Web page data is generated for rendering coupons, for a currency of value available to a user for increasing a value of the coupons and for one or more activities that can be used to increase the currency of value. When at least one of the activities has been completed by the user, the currency of value is increased by an amount specified by the activity that has been completed. A selection is received of a coupon whose value is to be increased. Additional web page data is generated to including dollar amounts to which the coupon may be increased. When the user selects one of the dollar amounts, a number of the currency of value is determined corresponding to the selected dollar amount. The value of the coupon is increased by the selected dollar amount. The currency of value available to the user are decreased by the number of the currency of value corresponding to the dollar amount.

20 Claims, 16 Drawing Sheets

(56) References Cited

U.S. PATENT DOCUMENTS

2013/0185126 A1* 7/2013 Stefanescu .................. 705/14.13
2013/0231999 A1* 9/2013 Emrich .............. G06Q 30/0271
                                                                                                     705/14.43

OTHER PUBLICATIONS

"Coupon Network: Increase Value of Coupons by Watching Videos," Queen Bee Coupons © 2013, 3 pages.
Odell, Patricia; "Hertz Coupon Value Increases with Facebook Shares," Chief!Marketer, Apr. 18, 2012, 3 pages.
"ShareitUp.com Launches Social Coupon & Deals platform for Facebook Business Pages at ad:tech NY," Business Wire, Nov. 9, 2011, 3 pages.

* cited by examiner

| | Quest Name | Available Points | Expires | Amount Completed |
|---|---|---|---|---|
| 1210 | $2.00 off The Astonishingly Superior Shave Cream | 85 Points | 191 Days | 1 of 3 Steps Completed — 33% |
| 1212 | $5.00 off Wellesse Calcium & Vitamin D3 | 90 Points | 200 Days | 1 of 7 Steps Completed — 14% |
| 1214 | $5.00 off Wellesse Vitamin D3 1000 IU | 90 Points | 200 Days | 1 of 7 Steps Completed — 14% |
| 1216 | $6.00 off Wellesse Joint Movement Glucosamine | 90 Points | 200 Days | 1 of 7 Steps Completed — 14% |
| 1218 | $5.00 off Wellesse Digestive 3-in-1 Health | 90 Points | 200 Days | 1 of 7 Steps Completed — 14% |
| 1220 | $5.00 off Wellesse MultiVitamin + | 90 Points | 200 Days | 1 of 7 Steps Completed — 14% |

1200 → 1202 / 1204 / 1206 / 1208

FIG. 12

INCREASE VALUE OF CONSUMER COUPONS

BACKGROUND

Consumer coupons are a popular way for consumers to lower shopping costs. Coupons are commonly available in hard copy, for example, through newspapers, through the mail and in supermarket flyers. Many consumers make it a habit to cut out coupons and take the coupons with them when they shop. Hard copy coupons are typically fixed value coupons that cannot be changed.

Another way to distribute consumer coupons is through the Internet. Using the Internet, a greater variety of coupons may be available to consumers. Data mining and other techniques may provide a way to direct specific coupons to specific customers based on customer profiles and buying habits.

SUMMARY

Embodiments of the disclosure are directed to a method to increase a value of a coupon. The method comprises: on a first electronic computing device, generating web page data to be rendered on a second electronic computing device, the web page data including information for rendering a plurality of coupons on the second electronic computing device, the web page data also including information for a currency of value available to a user to increase a value of one or more of the plurality of coupons, the web page data also including information for one or more activities that can be used to increase the currency of value available to the user; when at least one of the activities has been completed by the user, increasing the currency of value available to the user by an amount specified by the activity that has been completed; receiving a selection of a coupon whose value is to be increased; generating additional web page data to be rendered on the second electronic computing device, the additional web page data including dollar amounts to which the coupon may be increased; receiving at the first electronic computing device, an indication that the user has selected one of the dollar amounts to increase the value of the coupon; determining a number of the currency of value corresponding to the selected dollar amount; increasing the value of the coupon by the selected dollar amount; and decreasing the currency of value available to the user by the number of the currency of value corresponding to the dollar amount.

In another aspect, a method implemented on a client computer for increasing a value of a coupon comprises: rendering a user interface on the client computer, the user interface providing a display of a plurality of coupons available to a user, the user interface also providing a display of a plurality of activities that can be used to increase a currency of points that can be used to increase a value of a coupon, the user interface also providing a display of an amount of points available to the user to increase a value of the plurality of coupons; receiving a selection of a coupon to be increased in value; after the selection of the coupon is received, rendering a graphic on the user interface for increasing the value of the coupon; receiving a selection of a dollar amount to which the value of the coupon is to be increased; and when the selection of the dollar amount is received, rendering a change in the amount of points available to the user, the change in the amount of points corresponding to the dollar amount.

In yet another aspect, a computer-readable data storage memory comprising instructions that, when executed by a processing unit of an electronic computing device, causes the processing unit to: render a user interface on the client computer, the user interface providing a display of a plurality of coupons available to a user, the user interface also providing a display of a plurality of activities that can be used to increase a currency of points that can be used to increase a value of a coupon, the user interface also providing a display of an amount of points available to the user to increase a value of the plurality of coupons; receive a selection of a coupon to be increased in value; after the selection of the coupon is received, render a graphic on the user interface for increasing the value of the coupon; receive a selection of a dollar amount to which the value of the coupon is to be increased; and when the selection of the dollar amount is received, render a change in the amount of points available to the user, the change in the amount of points corresponding to the dollar amount.

The details of one or more techniques are set forth in the accompanying drawings and the description below. Other features, objects, and advantages of these techniques will be apparent from the description, drawings, and claims.

DESCRIPTION OF THE DRAWINGS

FIG. 12 shows an example user interface for summarizing quest activities for a user.

DETAILED DESCRIPTION

Figure 1:
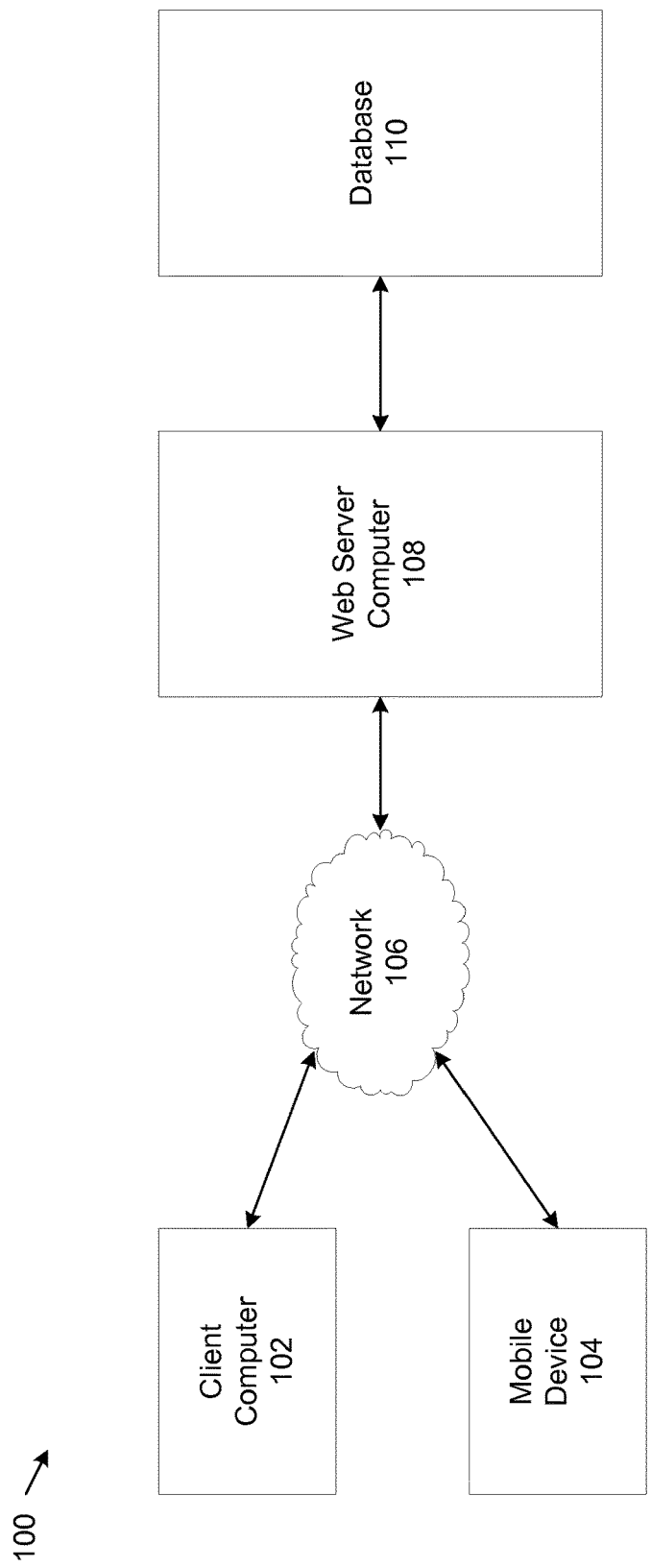
FIG. 1 shows an example system that supports increasing values of consumer coupons.

The present disclosure is directed to a system and methods for increasing values of coupons made available over the Internet. Users logon to a coupon website and can use a currency of value that may be applied to increase the value of coupons made available on the website. The currency of value is translated into a monetary amount when a user decides to increase a value of a coupon. The currency of value may include items like points, cash or similar items that can be exchanged into an economic value, such as a monetary amount. In this disclosure, the currency of value is discussed in terms of a currency of points. However, other currencies of value may be used.

When a user decides to use a portion of available points to increase the value of a coupon, the user selects a coupon and then determines how much to increase the value of the coupon. When the user decides on the amount to increase the value of the coupon, the currency of available points is reduced by an amount corresponding to the amount of the increase. Typically, the currency of available points is reduced by 100 points for every 10 cents that a coupon is increased in value, although other point to money ratios may be used.

Each user may increase the currency of available points by performing certain activities. Activities may include such user actions as signing up for a newsletter for a product, watching a video about the product, liking the product on a social networking website, following the product on a social networking web site, etc. Other activities that may increase the currency available points are possible. In addition, each user may increase the currency of available points in other ways. For example, some retailers may award the user points if a coupon for a product is redeemed at a specific retailer location. In this way, retailers may incentivize customers to redeem their coupon at the retailer's location instead of at a competing retailer's location. As another example, the currency of available points may be increased based on marketing demographics for a user. Marketing demographics may include such items as age, sex, purchase history, buying data, social profile, location, etc. Other ways to increase the currency of available points for a user are possible.

The coupons presented to a user and the activities associated with increasing the value of a coupon can be based upon an identity of the user. A user logs onto the coupon website and may provide personal information relating to educational level, income and buying interests. The personal information, a history of a user's activity on the coupon website and other information may be used to personalize the coupon experience for the user. Personalizing the user experience may make it more likely that the coupons presented to the user are of interest to the user, that the coupons are used and that the activities associated with increasing the value of the coupons are activities that the user is likely to engage in. In addition, the value of a coupon may be increased by completing a specific group of activities, sometimes known as quest activities, as discussed later herein. The value of a coupon may also be increased by sharing the coupon with friends. Other ways to increase the value of a coupon are possible.

FIG. 1 shows an example system 100 that may be used to increase the value of a consumer coupon. The example system 100 includes a client computer 102, a mobile device 104, a network 106, a web server computer 108 and a database 110. The client computer 102 may be a desktop computer, a laptop computer or similar type of computing device. The mobile device 104 is a mobile electronic computing device, most typically a smart telephone. The client computer 102 and mobile device 104 are electronic computing devices. The network 106 is a network that provides remote access for client computer 102 and mobile device 104. Such a network may be the Internet, a wireless network for remote telephone communication or a combination of the two. The web server computer 108 is a server computer that is configured to host a web site for accessing consumer coupons. The web server computer 108 may be a standalone computer or may be part of a web farm of server computers. The database 110 is a data storage device. More than one client computer, mobile device, web server computer, web farm and data storage device may be used.

Figure 2:
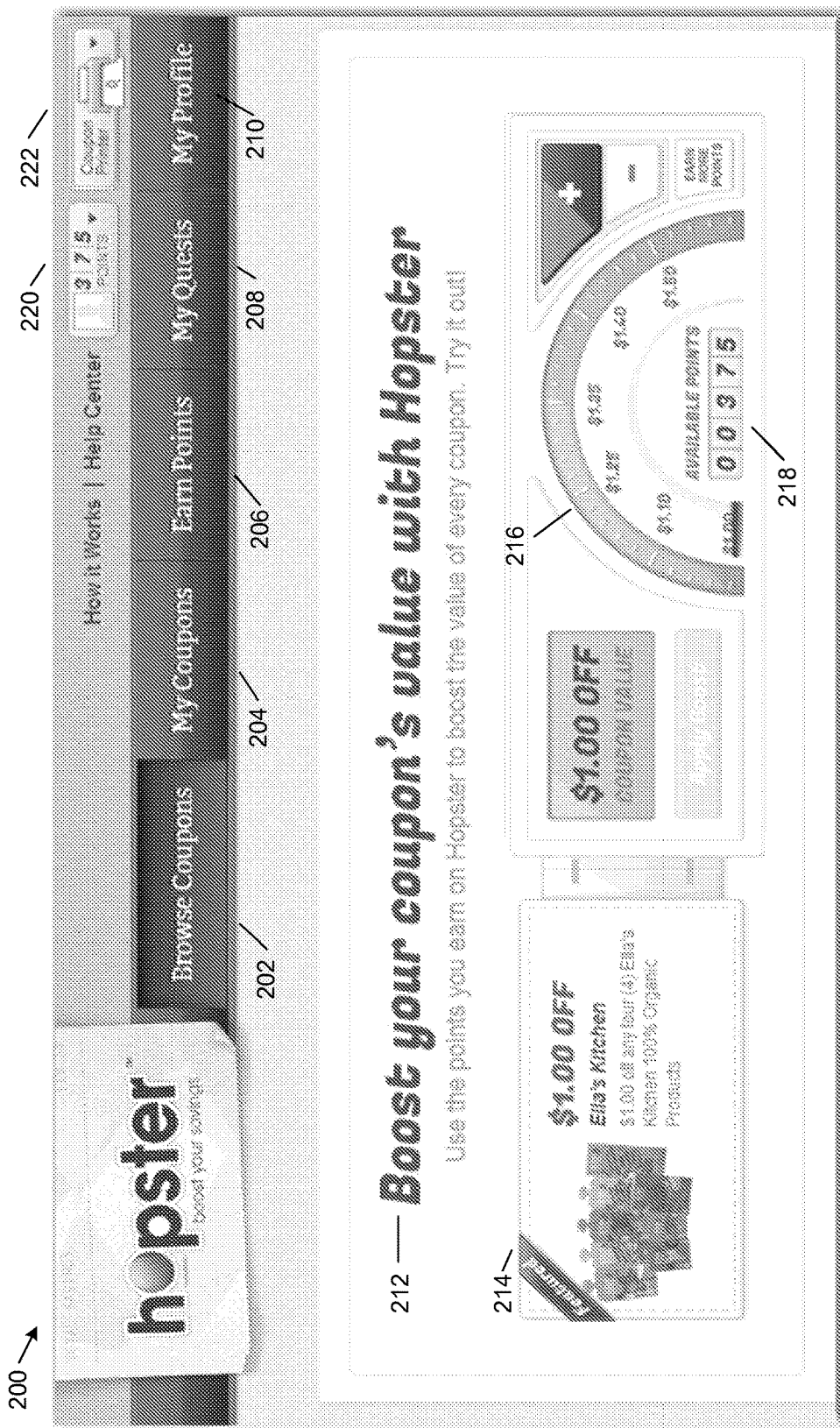
FIG. 2 shows an example home user interface of a coupon website that may be rendered on the client computer or mobile device of FIG. 1.

FIG. 2 shows an example home user interface 200 of a coupon website. The home user interface 200 is displayed after a user signs into the coupon website. The home user interface 200 includes an example banner 212, indicating that coupons can be increased in value. The home user interface 200 shows an example coupon 214 for Ella's Kitchen having a value of $1.00 off. The home user interface 200 also shows an example graphic 216 that provides a means to increase the value of the coupon from $1.00 off to one of $1.10, $1.25, $1.35, $1.40 or $1.50 off. The graphic 216 has the form of a speedometer and provides a gaming feel to the website. The home page also shows an amount of available points 218 that may be used to increase the value of the coupon. For this coupon website, a user is initially given 250 free points. The user that is signed-in to the coupon website has increased the available point total from 250 to 375 by completing various activities, as discussed later herein. Different coupons, coupon amounts and graphics may be used. For example, the user may be initially given 750 free points. A more detailed discussion of how coupon values may be increased in value is provided later herein.

The example home user interface 200 also includes tabs for accessing aspects of the website. The tabs include a browse coupons tab 202, a my coupons tab 204, an earn points tab 206, a my quests tab 208 and a my profile tab 210. In addition, the home user interface 200 displays the points 220 that are available for the user and a coupon printer graphic 222, indicating a number of coupons that are ready to be printed. The browse coupons tab 202 displays coupons available on the website for the user. The my coupons tab 204 displays coupons that have been selected by the user. The earn points tab 206 displays activities that may be used to earn points that can increase the currency of available points used to increase coupon values. The my quests tab 208 displays a summary of quests that the user has started. A quest is a group of activities for a product, such that when all quest activities for the product are completed, the user may earn a bonus coupon for the product. The my profile tab 210 displays profile information for the user and permits the user to modify the user's profile. Detailed discussions of these tabs are provided later herein.

Figure 3:
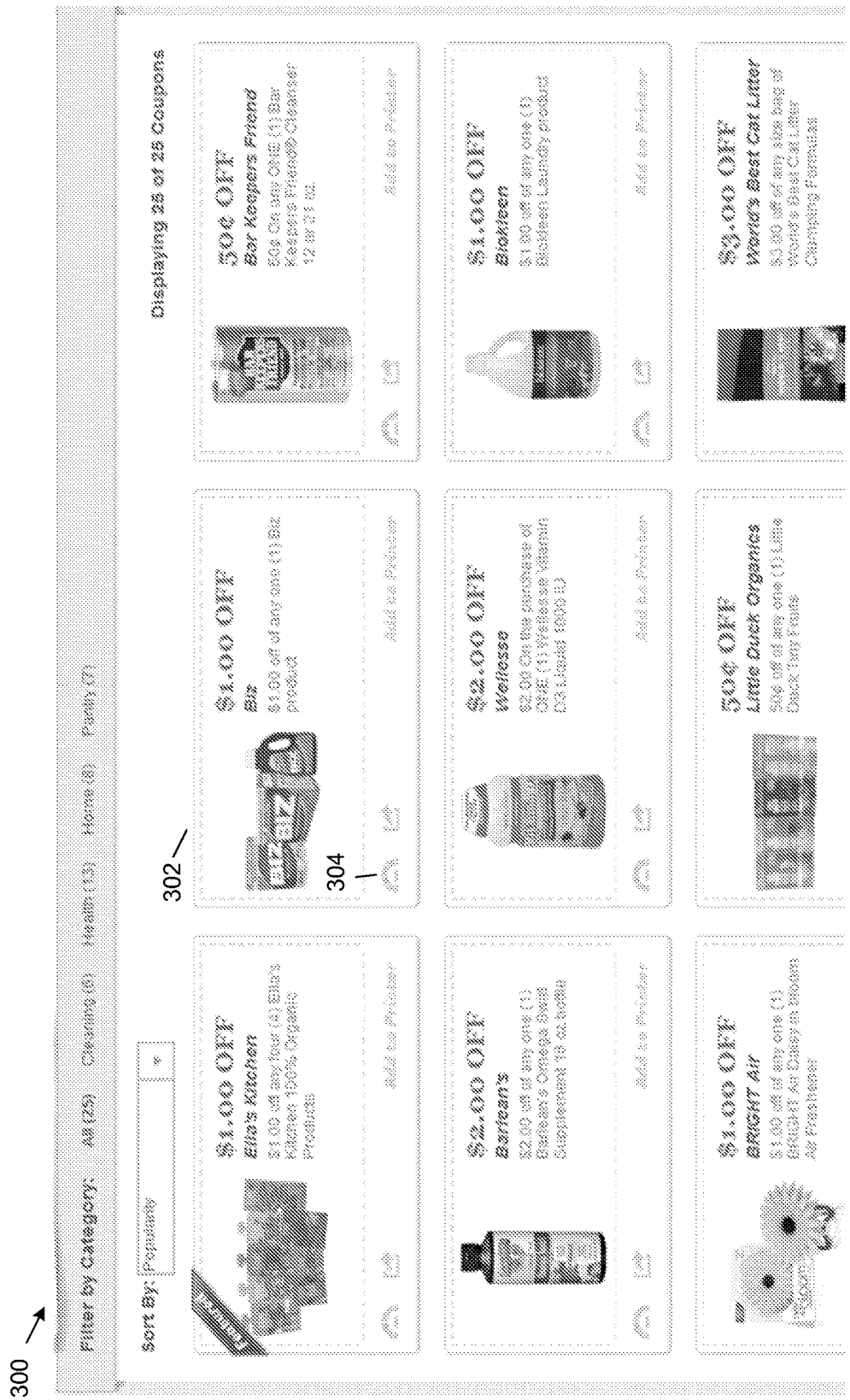
FIG. 3 shows an example user interface showing coupons available on the coupon website.

FIG. 3 shows an example user interface 300 that is displayed when the browse coupons tab 202 is selected. In this disclosure, a web page screen may represent an entire web page or a portion of a web page. The example user interface 300 shows nine example coupons that may be selected by the user. Some or all of the coupons may be coupons that are specifically selected for the user based on the user's profile, buying history and other factors. Each coupon displays a monetary value for the coupon and also includes an icon that, when selected, initiates a process for increasing the value of the coupon. For example, coupon 302 for the Biz cleaning product includes a speedometer type icon 304. When icon 304 is selected, typically by clicking the icon, a screen is displayed for increasing the value of the coupon.

Figure 4:
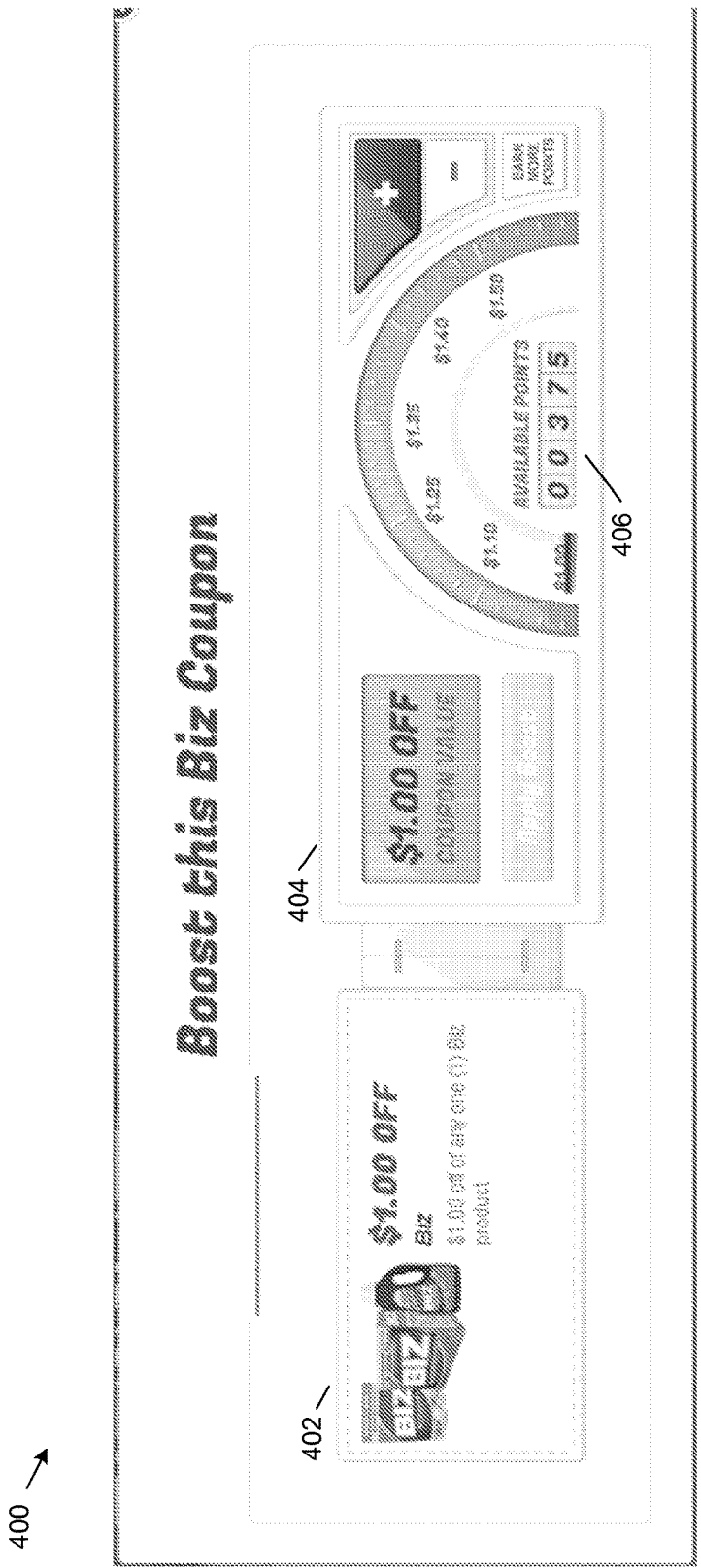
FIG. 4 shows an example user interface for increasing a value of a coupon.

FIG. 4 shows an example user interface 400 that may be used to increase the value of the Biz cleaning product. The example user interface 400 includes the selected coupon 402 and a graphic 404 that may be used to increase the value of coupon 402. The example user interface 400 also shows the points available 406 for increasing the value of coupon 402. In this example, the user has 375 points available.

Figure 5:
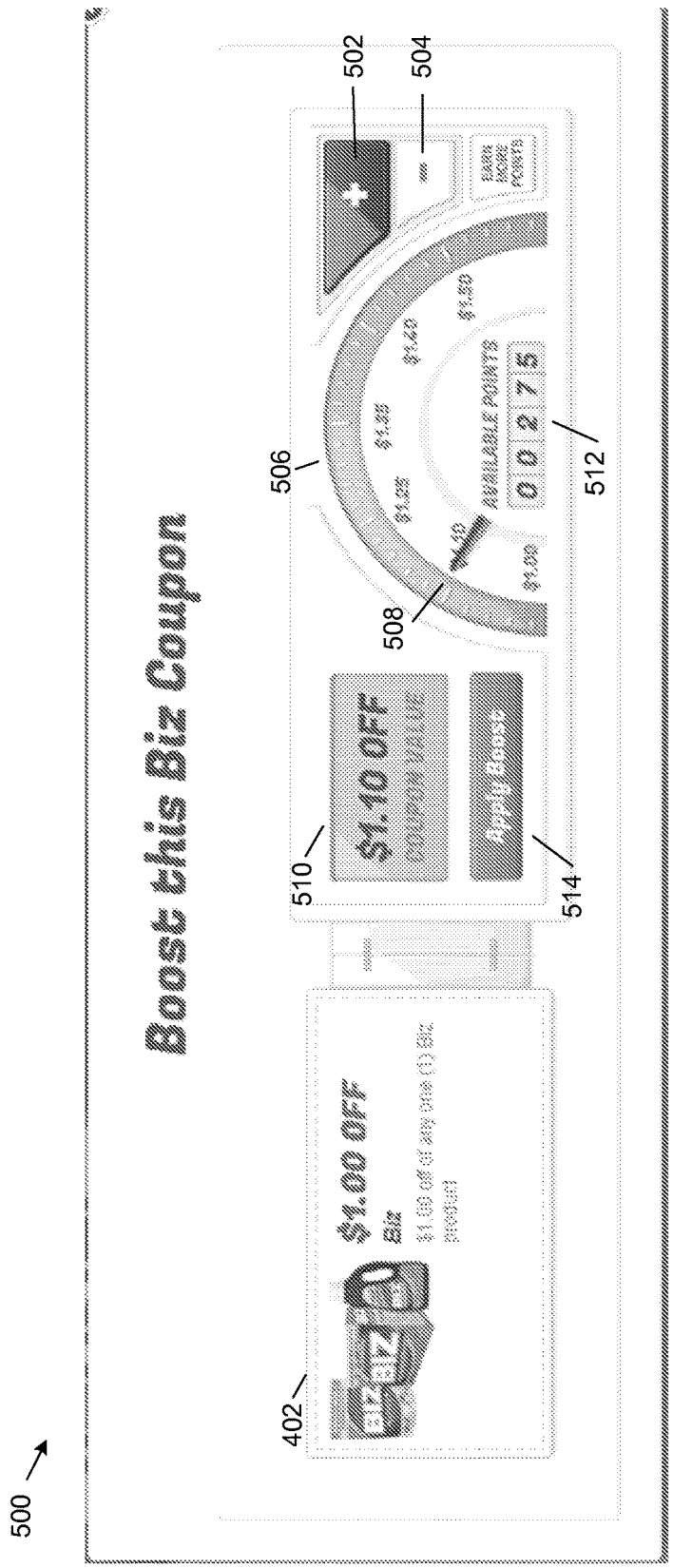
FIG. 5 shows another example user interface of FIG. 4 during the increasing of the value of the coupon.

FIG. 5 shows an example user interface 500 that demonstrates a process for increasing the value of coupon 402. The example user interface 500 includes an increase button 502 and a decrease button 504. The example increase button 502 is designated by a plus symbol and the decrease button 504 is designated by a minus symbol. Each time the increase button 502 is clicked, the value of the coupon 402 increases and each time the decrease button 504 is clicked, the value of coupon 402 decreases. For the example shown in FIG. 5, the value of coupon 402 increases by a predetermined amount each time the increase button 502 is clicked and decreases by a predetermined amount each time the decrease button 504 is clicked. For example, when the increase button 502 is clicked once, the value of coupon 402 increases from $1.00 to $1.10. When the increase button 502 is clicked a second time, the value of coupon 402 increases from $1.10 to $1.25.

As shown in FIG. 5, the example user interface 500 includes a speedometer-type graphic 506 that shows specific dollar amounts that are available for the coupon. A speedometer needle moves to show a current dollar amount for the coupon each time the increase button 502 or the decrease button 504 is clicked. As shown, the speedometer needle shows that the value of the coupon is $1.10. The current dollar amount of the coupon is also shown in the coupon value area 510. FIG. 5 also shows the available points 512. As shown, when the coupon value changes from $1.00 to $1.10, the available points changed from 375 to 275. This corresponds to a 100 point change for a 10 cent increase in the value of the coupon. The relationship between points and coupon value may be different in different examples.

When the user decides on a specific dollar amount to which the coupon is to be increased, the user clicks a button 514 to increase the coupon to the specified dollar amount. The user can continue to increase the value of the coupon until the user exhausts the user's points. For example, if the user had 300 points, and each 10 cent increase costs 100 points, the user can increase a coupon up to 30 cents.

Figure 6:
FIG. 6 shows an example user interface showing a print queue after the value of the coupon in FIG. 5 is increased.

FIG. 6 shows an example user interface 600. The example user interface 600 may be displayed after the button 514 is clicked. The example user interface 600 shows that a coupon for $1.10 has been added to the user's print queue 602 for Biz Stain Fighter.

Figure 7:
FIG. 7 shows yet another view of the example user interface of FIG. 4 after the value of the coupon is increased.

FIG. 7 shows an example user interface 700 for the user after value of the Biz Stain Fighter has been increased. The user interface 700 shows in two areas, points indicator 702 and available points counter 706, that the user now has 275 available points (down from 375 available points) and shows in a coupon printer graphic 704 that the user has one coupon ready to print.

Figure 8:
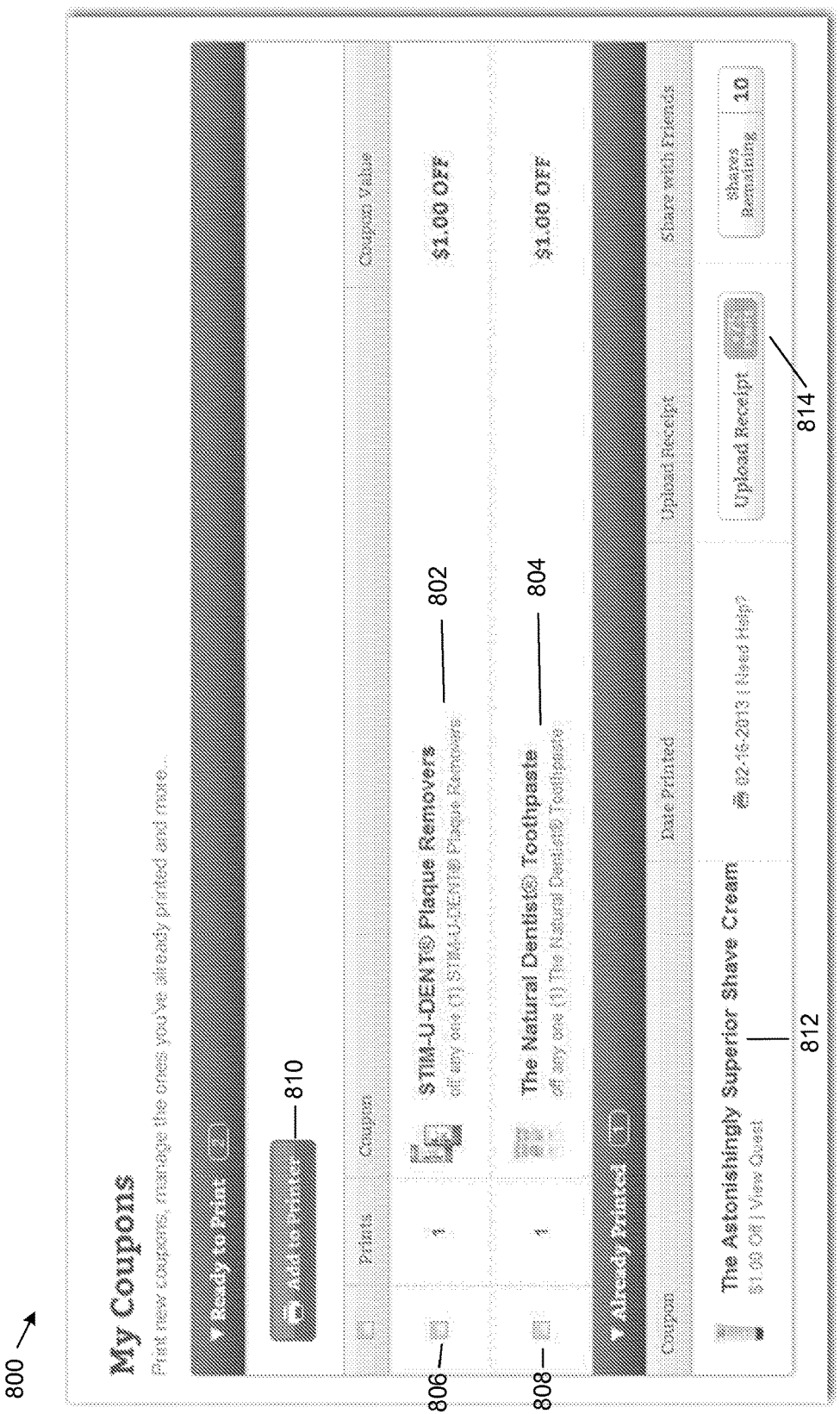
FIG. 8 shows an example user interface that displays coupons currently selected by a user.

FIG. 8 shows an example my coupons user interface 800 that displays coupons that the user has selected. The my coupons user interface 800 is displayed when the my coupons tab 204 is selected on the home user interface 200. The my coupons user interface 800 shows that the user has selected two coupons, coupon 802 and coupon 804, that are ready to be added to a coupon printer. When a coupon is to be added to the coupon printer, a checkbox to the left of each coupon, for example checkbox 806 and checkbox 808, respectively, is selected. The add to printer button 810 is then clicked to add the selected coupon(s) to the coupon printer.

The my coupons user interface 800 also lists a status of coupons for the user that have already been printed. For example, the my coupons user interface 800 shows that coupon 812 for "The Astonishingly Superior Shave Cream" was printed on Feb. 16, 2013. Also shown is a graphic 814, indicating that when coupon 812 is actually used, and when a receipt for coupon 812 is uploaded to the coupon website, the user will receive additional points, in this case 75 points. The additional points will be added to the user's currency of available points that may be used to increase a value of other coupons.

Figure 9:
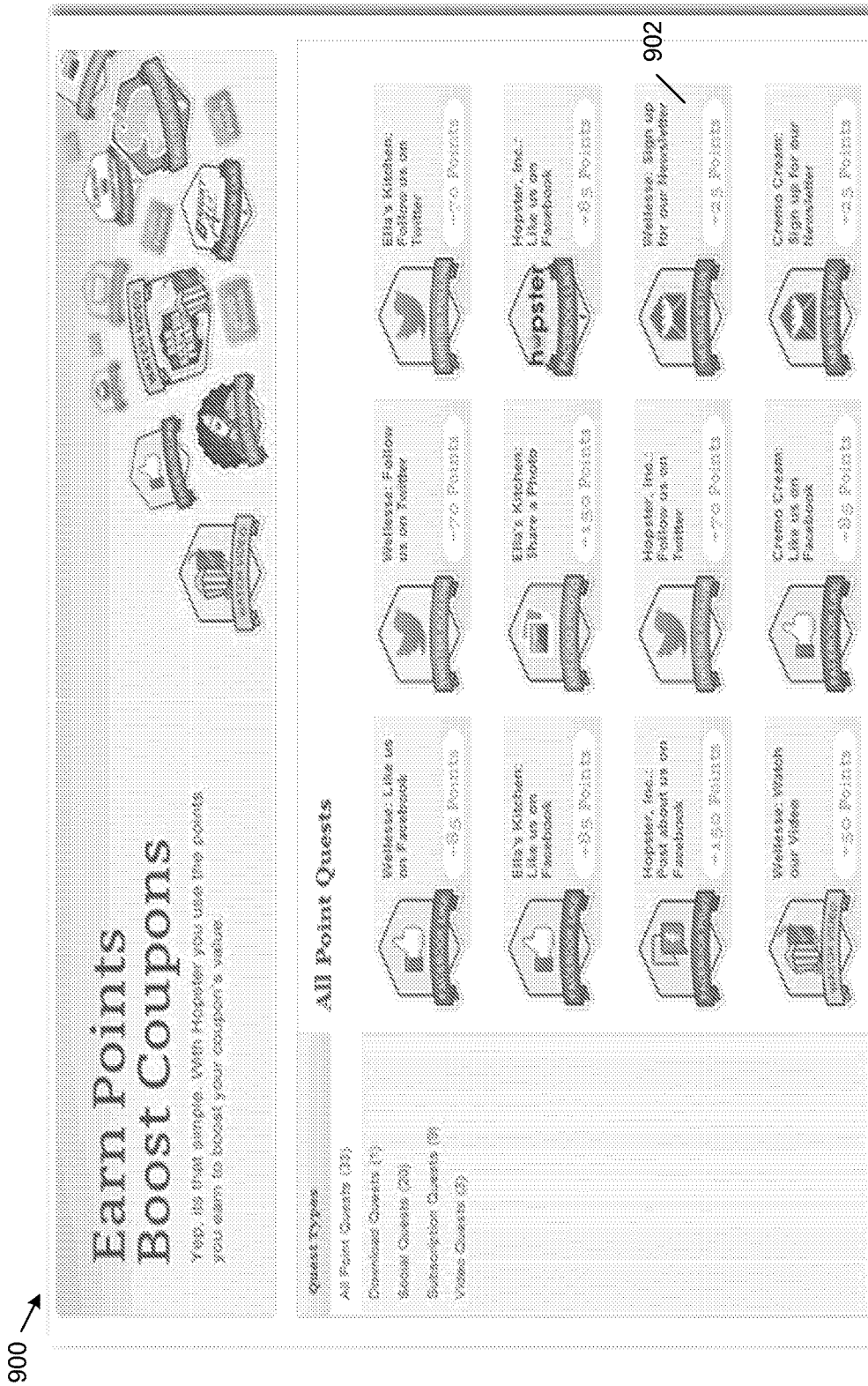
FIG. 9 shows an example user interface that displays quest activities that may increase a user's currency of points for increasing coupon values.

FIG. 9 shows an example earn points user interface 900. The earn points user interface 900 is displayed when the earn points tab 206 is selected on the home user interface 200. The earn points user interface 900 shows example quests for increasing a user's available points total. A quest is an activity or a group of activities that when performed can increase the user's available point total and which may also provide a bonus coupon for the user. One example quest 902 is for Wellesse products. For quest 902, when a user signs up for a Wellesse newsletter, the user's available point total is increased by 25 points. There are also additional steps for quest 902, as discussed later herein.

Figure 10:
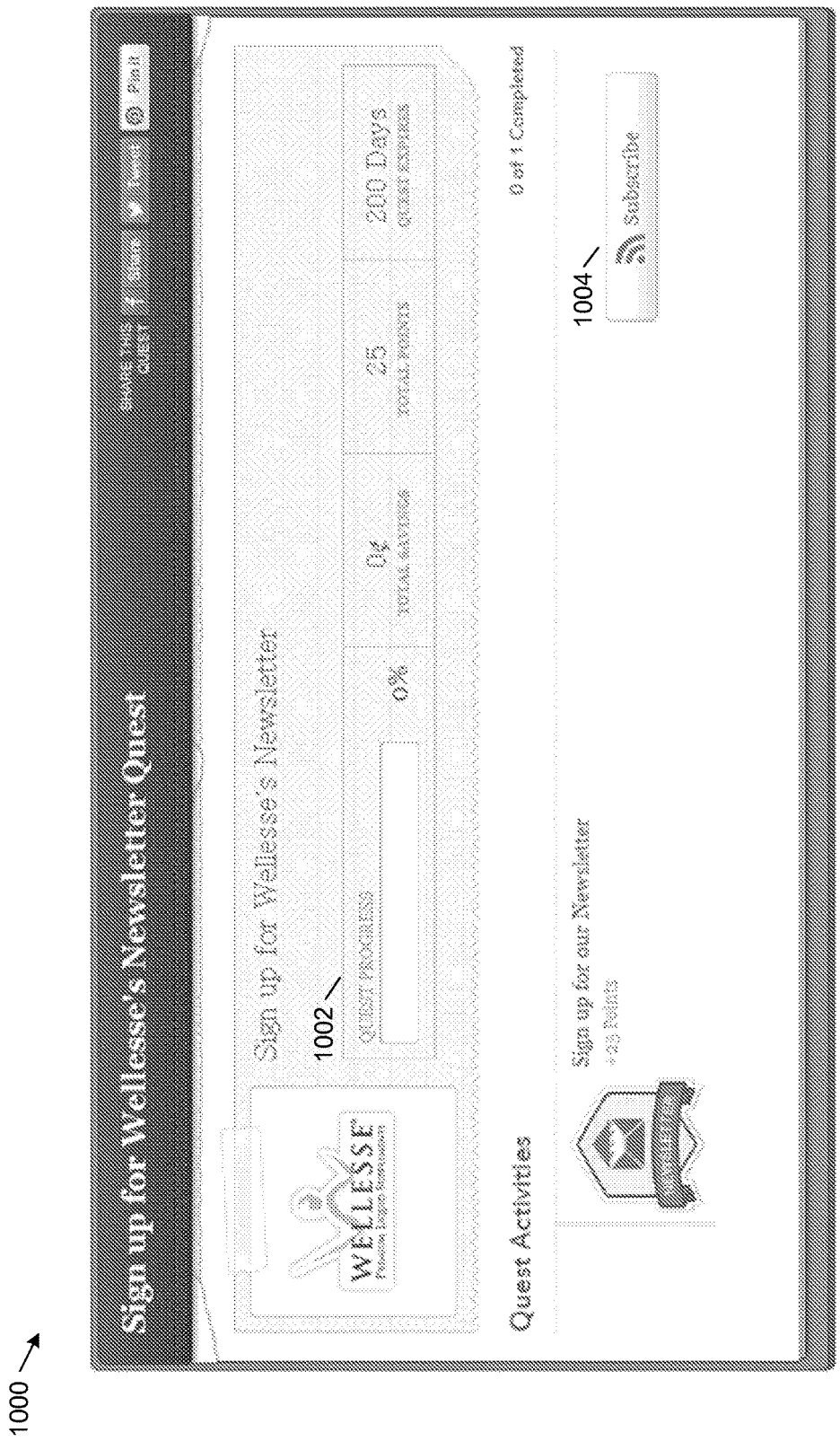
FIG. 10 show an example user interface sign-up screen for a newsletter.

FIG. 10 shows an example Wellesse newsletter user interface sign-up screen 1000. The Wellesse newsletter user interface sign-up screen 1000 is displayed when quest 902 is selected by the user. The user interface sign-up screen 1000 shows that the user has 200 days to complete the quest and that the user will receive 25 points when the user signs up for the newsletter. The user interface sign-up screen 1000 also includes a quest progress bar 1002 and a subscribe button 1004. The quest progress bar 1002 shows a status of the sign-up activity, in this case 0%. The newsletter sign-up is initiated when the user clicks the subscribe button 1004.

Figure 11:
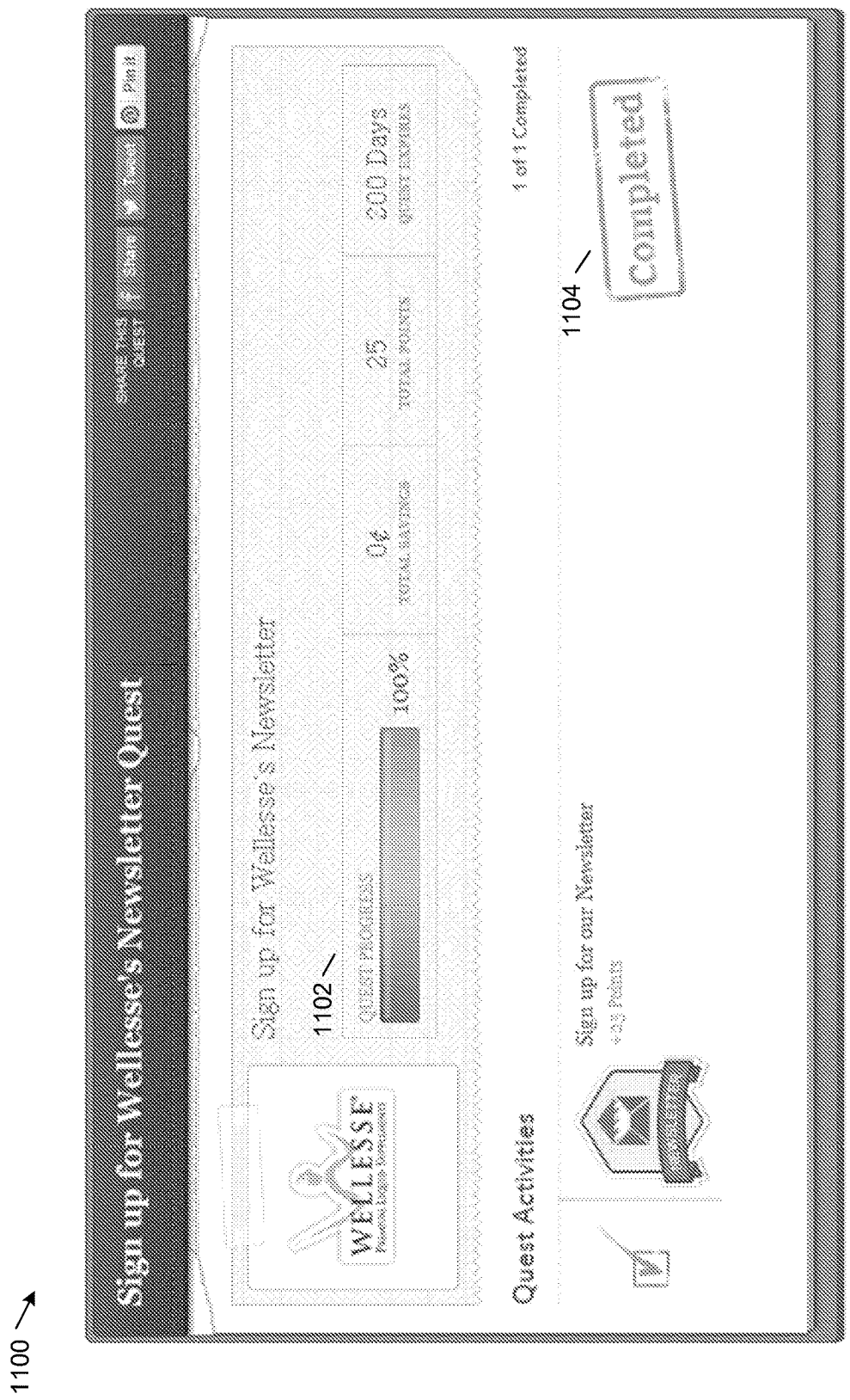
FIG. 11 shows another view of the user interface sign-up screen for the newsletter.

FIG. 11 shows an example Wellesse newsletter user interface sign-up screen 1100. The Wellesse newsletter user interface sign-up screen 1100 is displayed when subscribe button 1004 is clicked by the user. Progress bar 1102 shows that the sign-up is 100% completed. In addition, status graphic 1104 also indicates that the sign-up is completed.

FIG. 12 shows an example my quests summary user interface 1200. The my quests summary user interface 1200 is displayed when the my quests tab 208 is selected on the home user interface 200. The my quests summary user interface 1200 includes columns for quest name 1202, available points 1204 for the quest, an expiration 1206 in days for the quest and an amount completed 1208. The my quests summary user interface 1200 shows that the user has six active quests—quest 1210 for "The Astonishingly Superior Shave Cream" product and quests 1212, 1214, 1216, 1218 and 1220 for Wellesse products. Quest 1210 is initiated when the user printed a coupon for "The Astonishingly Superior Shave Cream" product. Quests 1212, 1214, 1216, 1218 and 1220 are initiated when the user signed up for the Wellesse newsletter. In general, a quest may be initiated by completing any one of user actions included within the quest. As indicated in FIG. 12, each Wellesse quest has seven steps and is worth 50 points. Signing up for the Wellesse newsletter was worth 25 points, so an additional 50 points may be gained by completing six additional steps. The six additional steps may comprise a plurality of activities, for example using Wellesse coupons.

Figure 13:
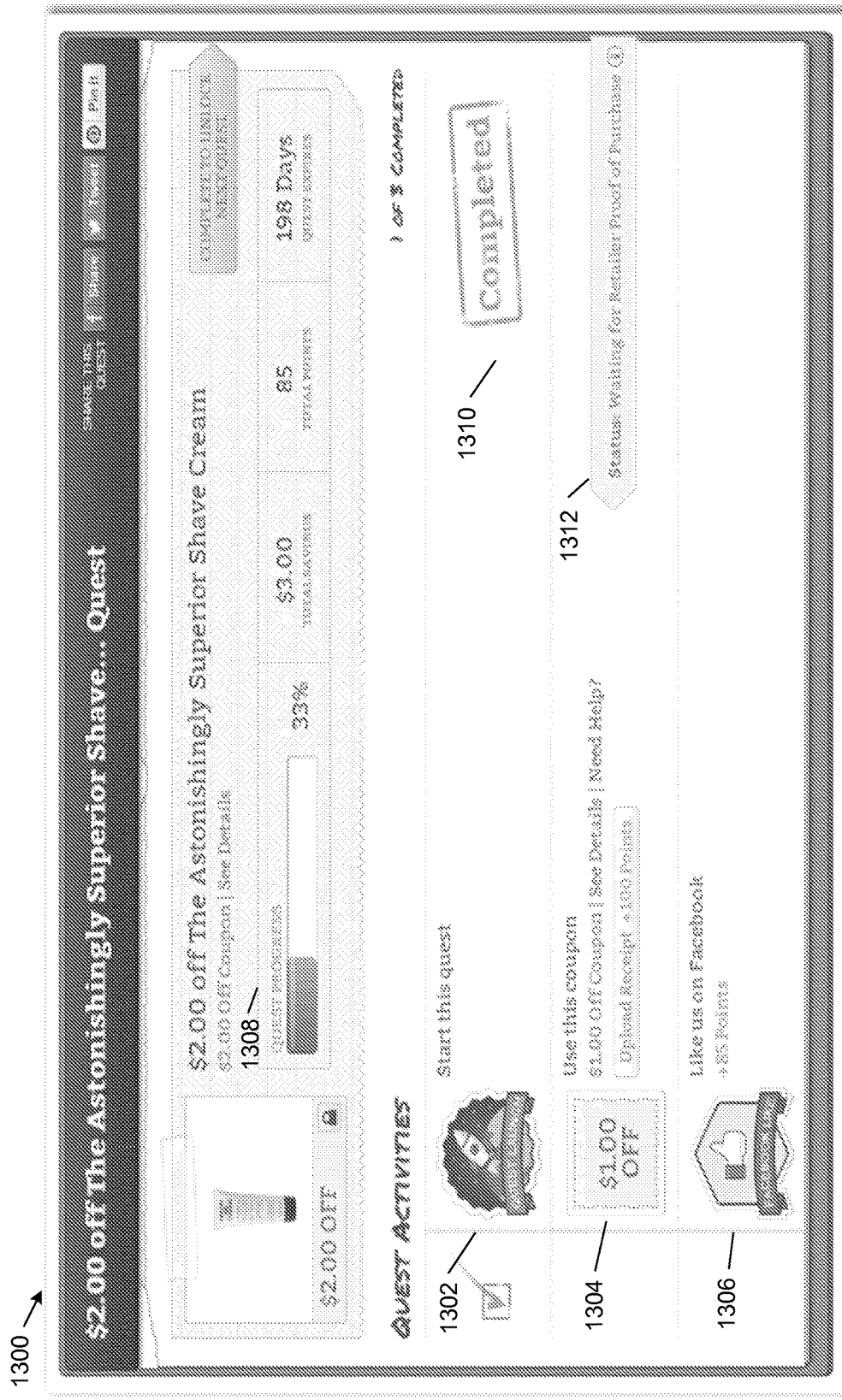
FIG. 13 shows an example user interface screen for summarizing quest activities for a specific product.

FIG. 13 shows an example quest details user interface 1300 with details about quest 1210 for "The Astonishingly Superior Shave Cream" product. Quest details user interface 1300 is displayed when quest 1210 is clicked on my quests summary user interface 1200. Quest details user interface 1300 shows that quest 1210 includes three quest activities—1302, 1304 and 1306. When the three quest activities are completed, the user gets an additional coupon for $2.00 off. As shown by progress bar 1308, the quest 1210 is 33% completed, indicating that one of the three quest activities is completed. As shown, the user has 198 days to complete quest 1210.

Quest activity 1302 is an activity that launched quest 1210. As discussed, the launching activity for quest 1210 is the printing of the coupon for "The Astonishingly Superior Shave Cream" product. Status area 1310 shows that quest activity 1302 is completed. Quest activity 1304 is using the printed coupon. Quest activity 1304 is completed when "The Astonishingly Superior Shave Cream" product is purchased using the printed coupon and a receipt of the purchase is uploaded to the coupon website. When the receipt is uploaded, 100 points are added to the user's currency of available points. In other examples, the receipt does not need to be uploaded to be redeemed. For these examples, using the coupon is sufficient; points are added to the user's currency of points when notification of the coupon's redemption is received by the coupon's processor. The 100 points that are added to the user's currency of points is an example number of points. A different number of points, for example 75 points, may be added to the user's currency of available points.

Status area 1312 shows that a current status of quest 1304 activity is waiting for a retailer proof of purchase. Quest activity 1306 is liking "The Astonishingly Superior Shave Cream" product on Facebook. When quest activity 1306 is completed, 85 points are added to the user's currency of available points.

Figure 14:
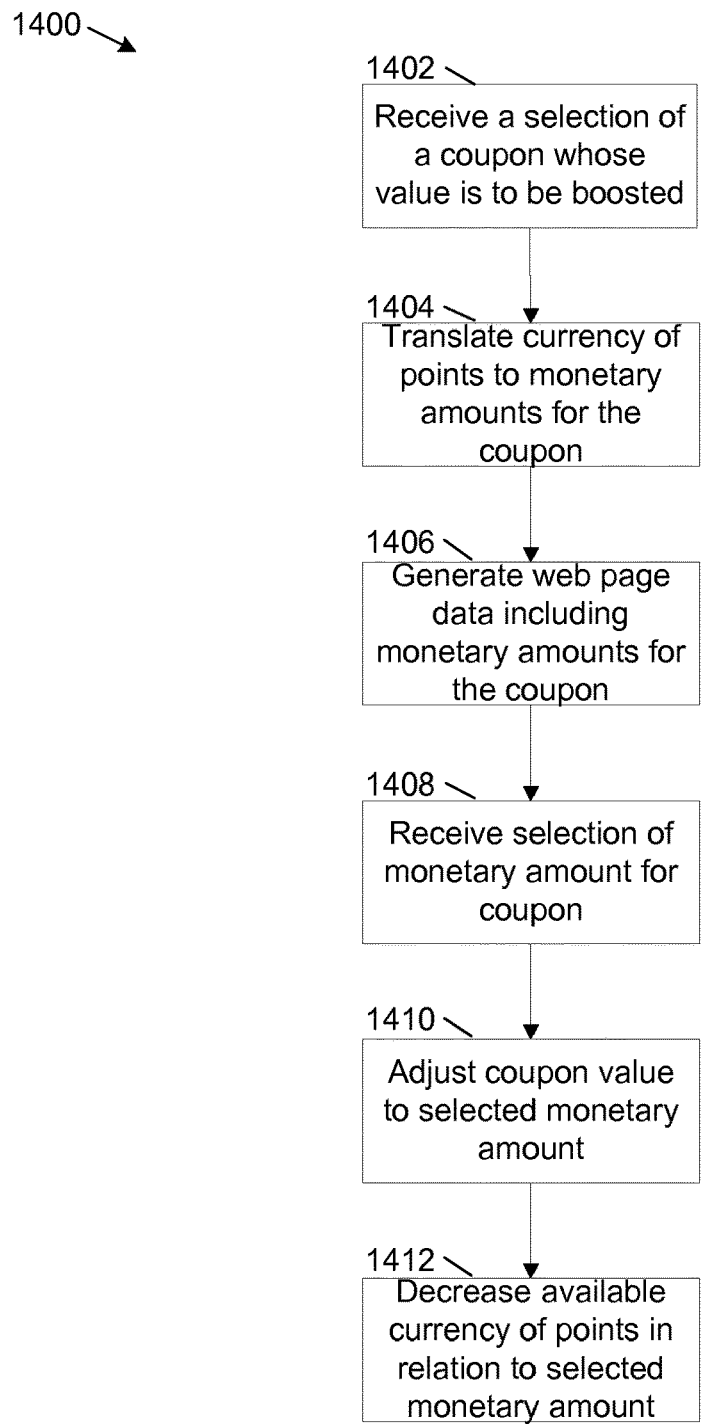
FIG. 14 shows an example flowchart for a method implemented on the server computer of FIG. 1 for increasing the value of a coupon.

FIG. 14 shows an example flowchart 1400 for a method implemented on web server computer 108 for increasing the value of a coupon. At operation 1402, a selection of a coupon whose value is to be increased is received at web server computer 108. In this example, the selection is made by a user at a client computer 102.

At operation 1404, a currency of points is translated to monetary amounts for the coupon. In this example, the coupon has a face value of $1.00. In this example, every 100 points corresponds to a 10 cent increase in the value of the coupon. In other examples, a different ratio of points to monetary amount may be used. Typically, a fixed number of monetary amounts are generated. For example, monetary amounts of $1.10, $1.25, $1.50, $1.75 and $1.90 may be generated. These monetary amounts translate to point values of 100, 250, 500, 750 and 900, respectively. In other examples, different monetary amounts may be used.

At operation 1406, web page data is generated that includes the monetary amounts generated for the coupon. The web page data is sent to client computer 102 to be rendered on a display screen of client computer 102.

At operation 1408, a selection of a monetary amount for the coupon is received at web server computer 108. In this example, the user at client computer 102 makes a selection of one of $1.10, $1.25, $1.50, $1.75 or $1.90 as a value to which the coupon is to be increased. The selected value is the monetary amount for the coupon received at operation 1408.

At operation 1410, the coupon value is adjusted to the selected monetary amount, in this example one of $1.10, $1.25, $1.50, $1.75 or $1.90. At operation 1412, the currency of points available to the user is decreased in relation to the value to which the coupon is adjusted. In this example the currency of points available to the user is decreased by one of 100, 250, 500, 750 or 900 points.

Figure 15:
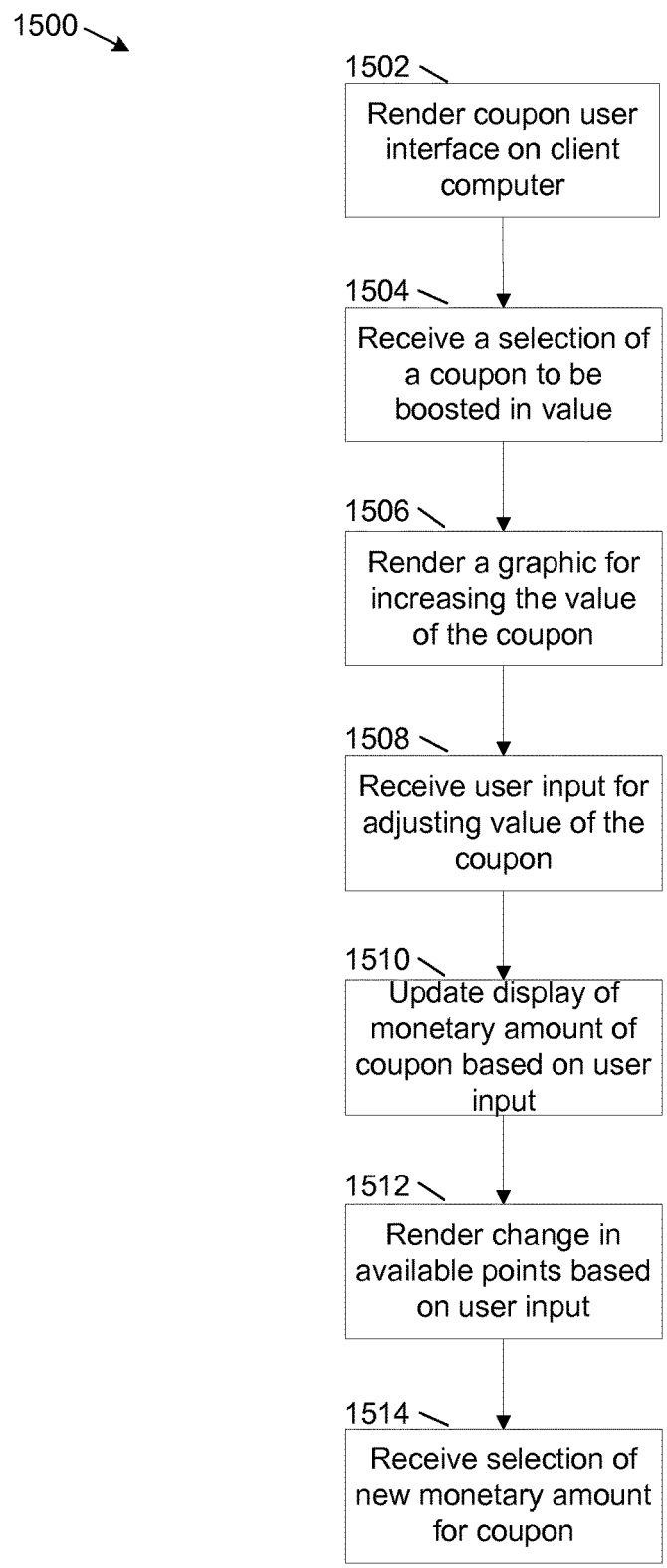
FIG. 15 shows an example flowchart for a method implemented on the client computer of FIG. 1 for increasing the value of the coupon.

FIG. 15 shows an example flowchart 1500 for a method implemented on client computer 102 for increasing the value of a coupon. At operation 1502, a user logs on to a coupon website and a coupon user interface is displayed on the client computer. The coupon user interface includes a rendering of a plurality of consumer coupons from which the user can select and from which a face value of a coupon can be increased.

At operation 1504, the user selects a coupon and the selection of the coupon is received at client computer 102. The user then clicks an icon on the coupon for increasing the value of the coupon. As a result of the user clicking the icon, at operation 1506, a graphic for increasing the value of the coupon is rendered on client computer 102. In some examples, the graphic has the appearance of a speedometer, with dollar amounts of the coupon shown on a semi-circular top of the speedometer and with a speedometer needle that moves to point to a selected dollar amount. In some examples, the icon on the coupon for increasing the value of the coupon is a miniaturized rendering of the speedometer.

At operation 1510, the user adjusts the speedometer to select a dollar amount to which the value of the coupon is to be increased. In some examples, the user clicks an increase button to increase the dollar amount and a decrease button to decrease the dollar amount. Typically, the coupon can be increased by predetermined fixed dollar amounts.

At operation 1512, as the dollar amount changes, client computer 102 renders a corresponding available points value. In some examples, the available points are rendered as a counter on the graphic. The counter displays a point value corresponding to the dollar amount. The point value corresponding to the dollar amount is based on a translation ratio between a monetary value and a point value. In some examples, the point ratio is 100 points for every 10 cents of monetary value.

At operation 1514, a dollar amount is selected by the user and received at client computer 102. The selected dollar amount is displayed on client computer 102. In some examples, the selected dollar amount is rendered in a part of the graphic, showing the dollar amount to which the coupon is to be increased.

The points are monetized under various models. For example, in one embodiment, the manufacturer/brand owner associated with a given activity (e.g., a Like on Facebook) will pay a certain value to the system for the activity. This value can be directly or indirectly applied to fund the points given to the users. In an embodiment where retailers offer points to the users to redeem a coupon at a specific retailer location (e.g. at a Target store or a Wal-Mart store), the retailer will pay a certain value to the system for redeeming the coupon.

When the coupons with the increased values are redeemed, there are different models that allow for the compensation for that increased amount back to the given retailer/seller. Typically, the manufacturer compensates the retailer for redemption of the coupon, plus a nominal amount for covering the retailer's costs of redemption. In one model, the increased value is paid by the manufacturer back to the retailer. In another model, the system pays the increased value back to the retailer. In yet still another model, the retailer pays for the increased value. Other configurations are possible.

Figure 16:
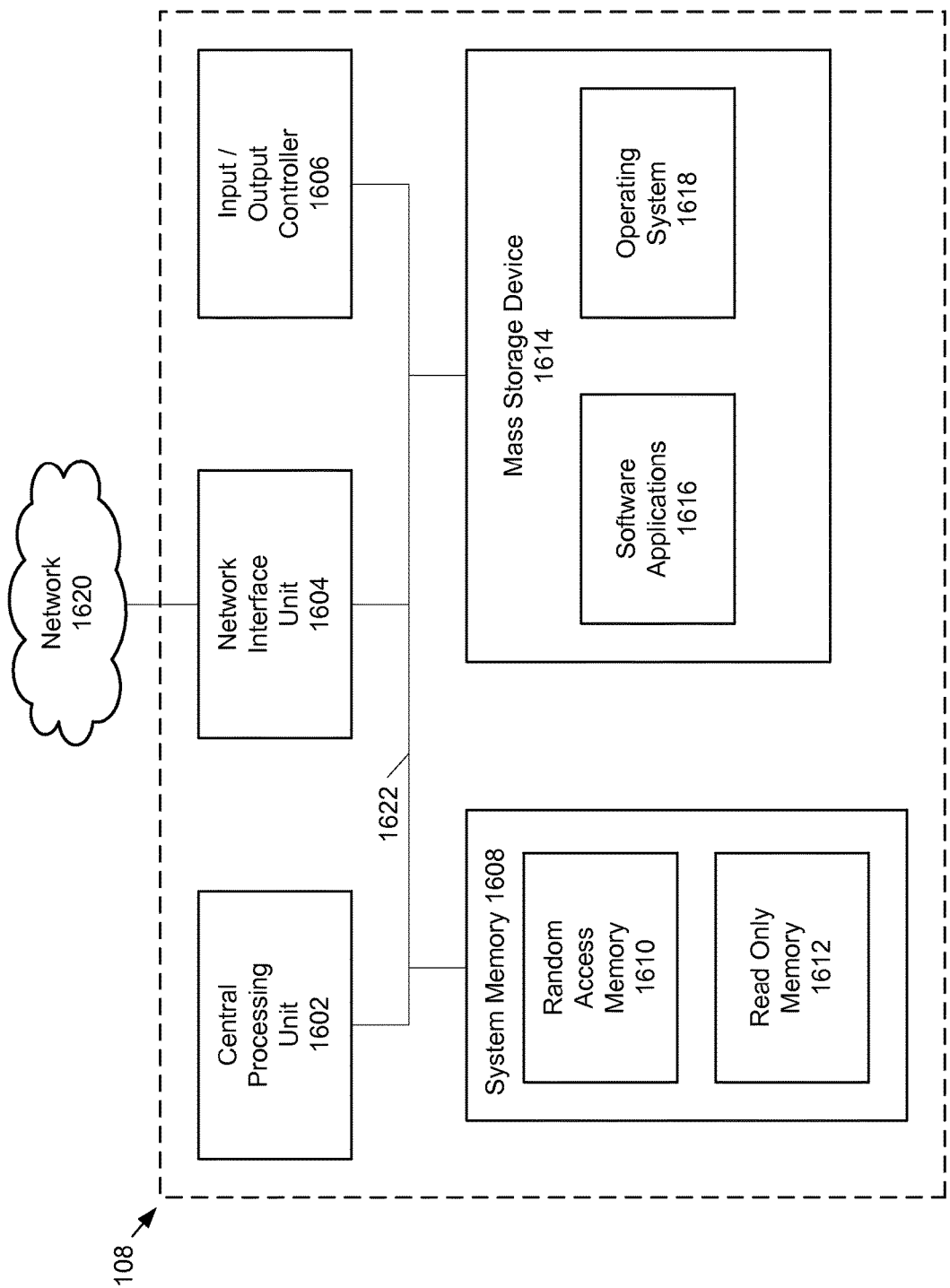
FIG. 16 shows example physical components of the web server computer of FIG. 1.

FIG. 16 illustrates example physical components of the web server computer 108. As illustrated in the example of FIG. 16, the web server computer 108 includes at least one central processing unit ("CPU") 1602, a system memory 1608, and a system bus 1622 that couples the system memory 1608 to the CPU 1602. The system memory 1608 includes a random access memory ("RAM") 1610 and a read-only memory ("ROM") 1612. A basic input/output system contains the basic routines that help to transfer information between elements within the web server computer 108, such as during startup, is stored in the ROM 1612. The web server computer 108 further includes a mass storage device 1614. The mass storage device 1614 is able to store software instructions and data.

The mass storage device 1614 is connected to the CPU 1602 through a mass storage controller (not shown) connected to the bus 1622. The mass storage device 1614 and its associated computer-readable data storage media provide non-volatile, non-transitory storage for the web server computer 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the web server computer 108.

According to various embodiments of the invention, the web server computer 108 may operate in a networked environment using logical connections to remote network devices through the network 1620, such as a local network, the Internet, or another type of network. The web server computer 108 may connect to the network 1620 through a network interface unit 1604 connected to the bus 1622. It should be appreciated that the network interface unit 1604 may also be utilized to connect to other types of networks and remote computing systems. The web server computer 108 also includes an input/output controller 1606 for receiving and processing input from a number of other devices, including a keyboard, a mouse, a touch user interface display screen, or another type of input device. Similarly, the input/output controller 1606 may provide output to a touch user interface display screen, a printer, or other type of output device.

As mentioned briefly above, the mass storage device 1614 and the RAM 1610 of the web server computer 108 can store software instructions and data. The software instructions include an operating system 1618 suitable for controlling the operation of the web server computer 108. The mass storage device 1614 and/or the RAM 1610 also store software instructions, that when executed by the CPU 1602, cause the web server computer 108 to provide the functionality of the web server computer 108 discussed in this document. For example, the mass storage device 1614 and/or the RAM 1610 can store software instructions that, when executed by the CPU 1602, cause the web server computer 108 to display web page data on the display screen of the web server computer 108.

Other example physical components of the web server computer 108 are possible. In general, the web server computer 108 supports a computing platform that provides capabilities for a standardized interface (for example USB) to retrieve data from a standardized network communication interface (for example WiFi), a standardized wireless communication interface (for example Bluetooth or NFC) and a user interface.

There are various advantages associated with the systems and methods described herein. For example, by allowing the user to earn points by completing activities, the user is incentivized to perform activities that are beneficial to the brands or retailers.

Further, the points are provided like a currency to the user, which allows the user to decide how to apply the points and in what amount. For example, the user may decide to apply all points to a single coupon or to spread the points out over two or more coupons. This gives the user flexibility when deciding how to apply the user's points.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system comprising:
a plurality of remote electronic devices, each comprising
a display,
an input device, and
a remote device processor coupled to said display and said input device; and
a server comprising a memory and a server processor coupled thereto, the memory configured to store a plurality of digital coupons having corresponding promotional values and a plurality of available redeemable values associated with a plurality of users, said processor configured to transmit the plurality of digital coupons and an associated one of the plurality of available redeemable values to a given one of said plurality of remote electronic devices, the associated available redeemable value being redeemable from a respective redeemable value source and toward a plurality of different ones of the plurality of digital coupons redeemable at a point-of-sale (POS) terminal at a given retailer location;
said remote device processor configured to
display, on said display, the plurality of digital coupons and the corresponding promotional values, each of the plurality of digital coupons and the corresponding promotional values being displayed as a graphical digital coupon icon on said display,
permit user selection, via said input device, of at least one of the plurality of digital coupons for redemption against the associated available redeemable value,
display, on said display, the associated available redeemable value and a plurality of user selectable activities for increasing the associated available redeemable value, each of the plurality of user selectable activities having different redeemable values associated therewith, the associated available redeemable value being displayed as an indicator icon configured to graphically display the associated available redeemable value and a user-determined desired amount of the associated available redeemable value corresponding to the user selected at least one digital coupon for redemption, the indicator icon comprising a rotatable pointer and associated indicia to graphically display the associated available redeemable value corresponding to the user selected at least one digital coupon for redemption, the indicator icon being adjacent a replication of a graphical digital coupon icon of the user selected at least one digital coupon on the display, permit user selection, via said input device, of at least one activity of the plurality thereof, permit user selection of the user-determined desired amount of the associated available redeemable value corresponding to the user selected at least one digital coupon for redemption, send the user selected user-determined desired amount of associated available redeemable value and at least one digital coupon for redemption to said server, and cooperate with said server to queue the user selected at least one digital coupon for printing thereby fixing the user-determined desired amount of associated available redeemable value and permitting redemption at the POS terminal;

said server processor configured to
increase the associated redeemable value with the corresponding different redeemable values based upon completion of the user selected at least one user selectable activity, and decrease the associated redeemable value and increase the promotional values of the user selected at least one digital coupon by a corresponding amount based upon the user-determined desired amount of the associated available redeemable value;

said remote device processor configured to update the indicator icon based upon a change in the associated redeemable value.

2. The system of claim 1 wherein each remote electronic device comprises wireless communications circuitry coupled to said remote device processor and cooperating therewith to wirelessly receive the plurality of digital coupons and wirelessly send the user selected user-determined desired amount of associated available redeemable value and at least one digital coupon for redemption to said server.

3. The system of claim 1 wherein said server processor is configured to transmit the plurality of digital coupons to the given remote electronic device based upon a user associated with the given remote electronic device.

4. The system of claim 3 wherein said server processor is configured to transmit the plurality of digital coupons to the given remote electronic device based upon a purchase history of the user.

5. The system of claim 1 wherein said server processor is configured to increase the associated redeemable value based upon a purchase history of a user associated with the given remote electronic device.

6. The system of claim 1 wherein said server processor is configured to increase the associated redeemable value based upon a geographical location of a user associated with the given remote electronic device.

7. The system of claim 1 wherein the different redeemable values associated with each of the plurality of user selectable activities are based upon a purchase history of a user associated with the given remote electronic device.

8. The system of claim 1 wherein the corresponding different redeemable values associated with each of the plurality of user selectable activities are based upon a geographical location of a user associated with the given remote electronic device.

9. A method comprising:
using a server comprising a memory and a server processor coupled thereto to transmit a plurality of digital coupons and an associated one of the plurality of available redeemable values stored in the memory to a given one of a plurality of remote electronic devices, the associated available redeemable value being redeemable from a respective redeemable value source and toward a plurality of different ones of the plurality of digital coupons redeemable at a point-of-sale (POS) terminal at a given retailer location;

using a given remote electronic device of the plurality thereof comprising a display, an input device, and a remote device processor coupled to the display and the input device to display, on a display, the plurality of digital coupons and the corresponding promotional values, each of the plurality of digital coupons and the corresponding promotional values being displayed as a graphical digital coupon icon on the display, permit user selection, via an input device, of at least one of the plurality of digital coupons for redemption against the associated available redeemable value, display, on the display, the associated available redeemable value and a plurality of user selectable activities for increasing the associated available redeemable value, each of the plurality of user selectable activities having different redeemable values associated therewith, the associated available redeemable value being displayed as an indicator icon configured to graphically display the associated available redeemable value and a user-determined desired amount of the associated available redeemable value corresponding to the user selected at least one digital coupon for redemption, the indicator icon comprising a rotatable pointer and associated indicia to graphically display the associated available redeemable value corresponding to the user selected at least one digital coupon for redemption, the indicator icon being adjacent a replication of a graphical digital coupon icon of the user selected at least one digital coupon on the display, permit user selection, via the input device, of at least one activity of the plurality thereof, permit user selection of the user-determined desired amount of the associated available redeemable value corresponding to the user selected at least one digital coupon for redemption, send the user selected user-determined desired amount of associated available redeemable value and at least one digital coupon for redemption to the server, and cooperate with the server to queue the user selected at least one digital coupon for printing thereby fixing the user-determined desired amount of associated available redeemable value and permitting redemption at the POS terminal;

the server further being used to
increase the associated redeemable value with the corresponding different redeemable values based upon completion of the user selected at least one user selectable activity, and decrease the associated redeemable value and increase the promotional values of the user selected at least one digital coupon by a corresponding amount based upon the user-determined desired amount of the associated available redeemable value;

the remote device further being used to update the indicator icon based upon a change in the associated redeemable value.

10. The method of claim 9 wherein the given remote electronic device is used to wirelessly send the user selected user-determined desired amount of associated available redeemable value and at least one digital coupon for redemption to the server via wireless communication circuitry.

11. The method of claim 9 wherein the server is used to transmit the plurality of digital coupons to the given remote electronic device based upon a user associated with the given remote electronic device.

12. The method of claim 11 wherein the server is used to transmit the plurality of digital coupons to the given remote electronic device based upon a purchase history of the user.

13. The method of claim 9 wherein the server processor is used to increase the associated redeemable value based upon a purchase history of a user associated with the given remote electronic device.

14. The method of claim 9 wherein the server processor is used to increase the associated redeemable value based upon a geographical location of a user associated with the given remote electronic device.

15. The method of claim 9 wherein the different redeemable values associated with each of the plurality of user selectable activities are based upon a purchase history of a user associated with the given remote electronic device.

16. The method of claim 9 wherein the different redeemable values associated with each of the plurality of user selectable activities are based upon a geographical location of a user associated with the given remote electronic device.

17. A non-transitory computer readable medium comprising computer executable instructions for causing a server processor to perform operations comprising:
   transmitting a plurality of digital coupons and an associated one of the plurality of available redeemable values stored in the memory to a given one of a plurality of remote electronic devices, the associated available redeemable value being redeemable from a respective redeemable value source and toward a plurality of different ones of the plurality of digital coupons redeemable at a point-of-sale (POS) terminal at a given retailer location, the transmitting causing a given remote electronic device of the plurality thereof comprising a display, an input device, and a remote device processor coupled to the display and the input device to
   display, on a display, the plurality of digital coupons and the corresponding promotional values, each of the plurality of digital coupons and the corresponding promotional values being displayed as a graphical digital coupon icon on the display,
   permit user selection, via an input device, of at least one of the plurality of digital coupons for redemption against the associated available redeemable value,
   display, on the display, the associated available redeemable value and a plurality of user selectable activities for increasing the associated available redeemable value, each of the plurality of user selectable activities having different redeemable values associated therewith, the associated available redeemable value being displayed as an indicator icon configured to graphically display the associated available redeemable value and a user-determined desired amount of the associated available redeemable value corresponding to the user selected at least one digital coupon for redemption, the indicator icon comprising a rotatable pointer and associated indicia to graphically display the associated available redeemable value corresponding to the user selected at least one digital coupon for redemption, the indicator icon being adjacent a replication of a graphical digital coupon icon of the user selected at least one digital coupon on the display,
   permit user selection, via the input device, of at least one activity of the plurality thereof,
   permit user selection of the user-determined desired amount of the associated available redeemable value corresponding to the user selected at least one digital coupon for redemption,
   send the user selected user-determined desired amount of associated available redeemable value and at least one digital coupon for redemption to the server, and
   queue the user selected at least one digital coupon for printing thereby fixing the user-determined desired amount of associated available redeemable value and permitting redemption at the POS terminal;
   increasing the associated redeemable value with the corresponding different redeemable values based upon completion of the user selected at least one user selectable activity; and
   decreasing the associated redeemable value and increase the promotional values of the user selected at least one digital coupon by a corresponding amount based upon the user-determined desired amount of the associated available redeemable value;
   causing the remote device processor to update the indicator icon based upon a change in the associated redeemable value.

18. The non-transitory computer readable medium of claim 17 wherein the computer-executable instructions cause the server processor to transmit the plurality of digital coupons to the given remote electronic device based upon a user associated with the given remote electronic device.

19. The non-transitory computer readable medium of claim 17 wherein the computer-executable instructions cause the server processor to transmit the plurality of digital coupons to the given remote electronic device based upon a purchase history of the user.

20. The non-transitory computer readable medium of claim 17 wherein the computer-executable instructions cause the server processor to increase the associated redeemable value based upon at least one of a purchase history of a user associated with the given remote electronic device and a geographical location of a user associated with the given remote electronic device.

* * * * *